H. B. KARLIN.
SYSTEM OF POWER GENERATION AND REGULATION.
APPLICATION FILED MAR. 18, 1911.
1,010,769.
Patented Dec. 5, 1911.
2 SHEETS—SHEET 1.
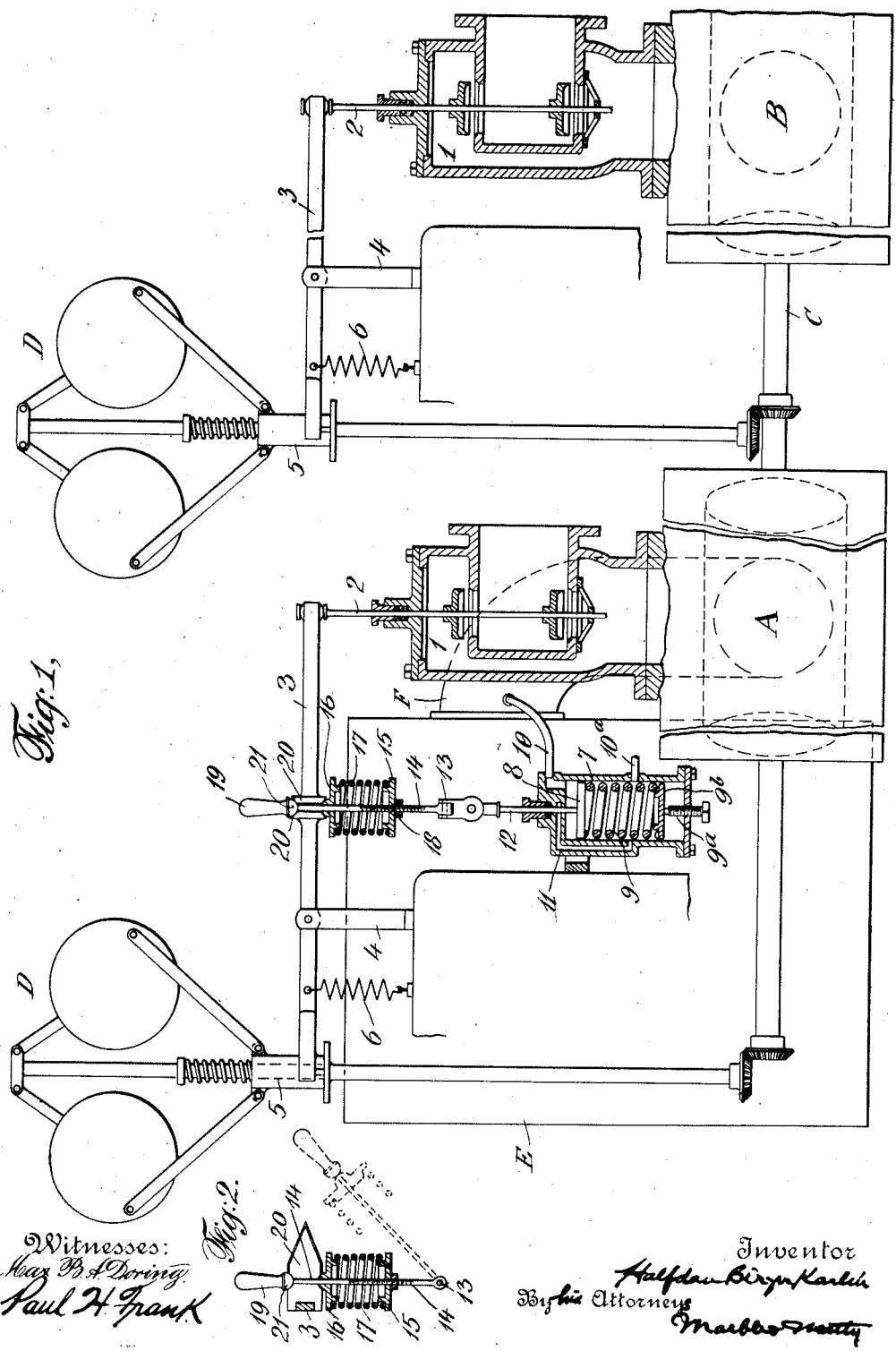

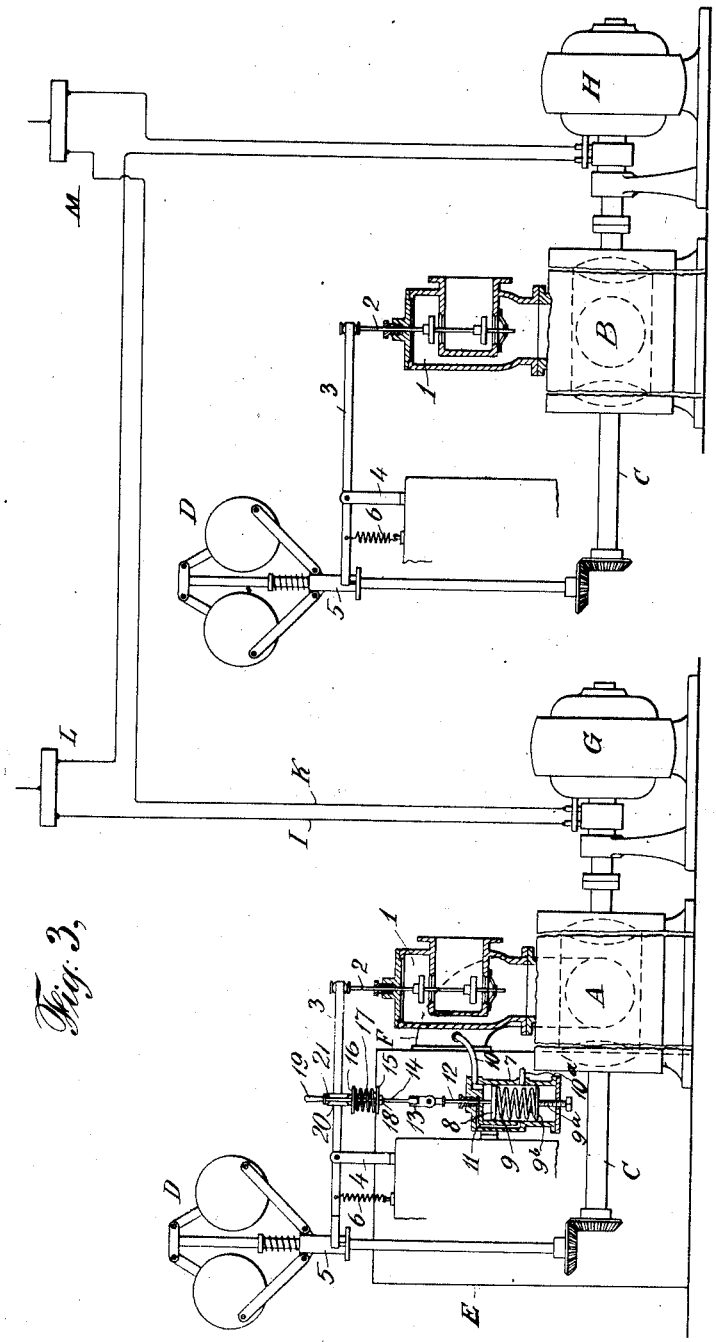

UNITED STATES PATENT OFFICE.

HALFDAN BIRGER KARLIN, OF STOCKHOLM, SWEDEN, ASSIGNOR TO DE LAVAL STEAM TURBINE COMPANY, OF NEW YORK, N. Y., A CORPORATION OF NEW JERSEY.

SYSTEM OF POWER GENERATION AND REGULATION.

1,010,769.      Specification of Letters Patent.      Patented Dec. 5, 1911.

Application filed March 18, 1911. Serial No. 615,298.

*To all whom it may concern:*

Be it known that I, HALFDAN BIRGER KARLIN, a citizen of Sweden, and a resident of Stockholm, Sweden, have invented certain new and useful Improvements in Systems of Power Generation and Regulation, of which the following is a specification.

My invention relates, generally, to a system of power generation by fluid pressure motors, and to the regulation of such motors, and relates particularly to systems wherein one or more of a plurality of fluid pressure motors are required to work under a back pressure, which it is desirable to maintain practically constant independent of variation of the load on the said motors, or which may be varied independent of varying load on the motors.

Specifically, my invention relates to systems comprising steam engines, and apparatus heated by the exhaust of one or more of said engines, and which produce or entail back pressure on the engine or engines supplying exhaust steam to them, which back pressure is to be kept constant, or varied as conditions in such apparatus may require, independent of variations in the load on said engines, and without causing variations in the total power output of said engines as a whole.

My invention comprises a plurality of fluid pressure motors (specifically, steam engines), delivering power to a common point, one or more of such motors or engines, but not all, delivering its or their exhaust to exhaust-operated apparatus by which back-pressure is produced on such motors or engines, and further comprises automatic means whereby such back pressure may be kept constant, or varied as desired, independent of variation in the total power output of such motors or engines, as a whole, together with means for automatically varying the power output of those motors or engines of the system which do not deliver their exhaust to such exhaust-operated apparatus, to compensate for varying power output of those motors or engines which are regulated with a view to maintaining, in the exhaust-operated apparatus, the desired pressure.

My invention further comprises improved regulating means, and other features, as hereinafter described and particularly pointed out in the appended claims.

The objects of my invention are, to maintain constant pressure in the exhaust-operated apparatus, and to permit variation of such back-pressure at will, without varying the total power output of the engines or motors, to permit variation at will of the total power output of such engines or motors without varying the pressure in the exhaust-operated apparatus or while varying at will the pressure in such exhaust-operated apparatus, to perform such regulation of the operation of the motors or engines automatically, to provide improved and simple pressure-controlled regulating means, and generally to make the system simple, reliable, and automatic in operation.

I will now proceed to describe my invention with reference to the accompanying drawings, in which a system and apparatus such as hereinbefore referred to is illustrated, more or less diagrammatically, and will then point out the novel features in claims.

In said drawings:—Figure 1 shows a diagrammatic elevation and partial section of a system such as hereinbefore referred to, parts of the apparatus being shown in vertical section; Fig. 2 shows a detail vertical section, on a plane at right angles to that of Fig. 1, of a portion of the fluid-pressure-operated regulator; and Fig. 3 is a view similar to Fig. 1 showing the inventions or motors driving independent electric generators delivering electric energy to common busbars, instead of driving a common shaft, as in Fig. 1.

In the drawings I have illustrated diagrammatically steam turbines as one type of fluid pressure motor which may be used according to my invention. It will be understood, however, that other types of fluid pressure motors, for example, reciprocating engines, may be used instead of turbines.

In the drawings A and B designate two diagrammatically illustrated steam turbines driving a common power shaft C. Numerals 1 designate the steam admission valves of such turbines, said valves comprising valve stems 2 connected by levers 3 pivoted to supports 4, to the actuating sleeves 5 of centrifugal governors D. Numerals 6 designate the springs of said centrifugal governors.

E designates some exhaust-operated apparatus, such as a drier, boiler, heater, or other apparatus such as may be operated by the exhaust of an engine, to which the exhaust of the engine A is delivered by means of a pipe F.

7 designates the cylinder of a fluid pressure regulator for turbine A having within it a piston 8 and a loading spring 9 adjustable by means of a screw $9^a$ acting upon a follower plate $9^b$ against which the lower end of the spring abuts.

10 designates a pipe connecting the upper end of the cylinder to the exhaust pipe F, and $10^a$ designates a pipe through which steam, which may leak past the piston, may be carried away. A duct 11 extends from around the piston rod 12 to a point in the cylinder 7 beneath the piston, whereby any steam which may leak around the piston rod 12 is conducted to the lower portion of the cylinder 7 and thence is carried away by pipe $10^a$.

The piston rod 12 of the regulator is connected, by a hinge-joint 13, to a latch-rod 14, itself arranged to be detachably connected, as hereinafter described, to the regulator lever 3. A spring 17 is mounted upon this rod 14, between follower plates 15 and 16; the follower plate 15 being adjustable upon the rod 14 by means of a screw nut 18, as shown, whereby the pressure of the spring 17 may be adjusted; the follower plate 16 being arranged to act upon the regulator lever 3. Normally, the strength of spring 17 is less than that of spring 9, for reasons hereinafter apparent.

The lever 3 is provided with two wedge-shaped projections 20 between which the rod 14 is adapted to pass, as indicated particularly in Fig. 2, and said rod is provided near its upper end with a stop 19 (which also, in the construction shown, constitutes a handle,) whereby, when rod 14 is in the position indicated in full lines in Fig. 2, the lever 3 is engaged on one side by the said stop or handle 19, and on the other side by the follower plate 16. But as will be obvious, the fluid pressure regulator may be readily disconnected from the centrifugal governor, by pulling the rod 14 out from engagement with the wedge-shaped pieces 20, to a position such as indicated in dotted lines in Fig. 2. The projections 20 are made wedge-shaped to facilitate reëngagement of the rod 14 with lever 3, and to the same end the stop 19 is provided with a curved boss 21.

The two regulator valves 1 shown, are ordinary balanced puppet throttle valves, and it will be understood that I do not limit myself to any particular construction of regulator valve. In the arrangement shown, only motor A supplies exhaust steam to the exhaust operated apparatus E, and therefore the centrifugal governor of motor B is not provided with any fluid pressure operated regulator; the intention being that, as the exhaust operated regulator of the motor A effects the adjustment of the valve 1 of that motor, to maintain the desired pressure in exhaust operated apparatus E, the centrifugal governor of motor B shall automatically operate to vary the power output of motor B to compensate for the variation in power output of motor A due to the operation of the exhaust operated regulator, so that the total power output of motors A and B may be the same, or may be varied, as conditions may demand, independent of the variation in power output of motor A due to the operation of the exhaust operated regulator.

The operation of the apparatus as thus described is as follows: If the back pressure on motor A rises, for any reason, above that pressure for which the exhaust operated regulator is set, such increased pressure, acting upon the upper side of the piston 8, and against the pressure of the loading spring 9, causes said piston to descend slightly, so pulling down the regulator lever 3 and partly closing the regulating valve 1 of motor A, so decreasing the flow of steam to motor A and thereby decreasing the flow of exhaust steam from motor A to exhaust operated apparatus E. If, on the other hand, the back pressure on motor A decreases below that for which the exhaust operated regulator is set, the piston 8 rises somewhat under the pressure of the spring 9 and such motion is communicated, through the spring 17, to the regulator lever 3, raising said lever and so opening the regulator valve 1 wider, to increase the supply of steam to motor A and therefore to increase the amount of exhaust steam delivered by said motor to exhaust operated apparatus E. As such variation in the supply of motive fluid to motor A necessarily varies the power output of motor A, the centrifugal governor D of motor B operates to vary the power output of motor B in complementary fashion, thereby keeping the total power output of the two motors constant. And similarly, if the load on the two motors A and B varies, the centrifugal governor D of motor B will operate to vary the power delivered by motor B to the end that the total power output of the two motors may be regulated in accordance with the load on said motors. It will be seen, however, that notwithstanding the connection of the exhaust operated regulator to the governor D of motor A, said governor nevertheless retains sufficient control over that motor to prevent over speeding in case the governor of motor B is unable to prevent such over speeding; for, in case of over speeding, the governor D of motor A will close valve 1 of that motor against the pressure of spring 17. It will also be obvious that at any time the exhaust operated regulator may be thrown out of action by disconnecting rod 14 from lever 3, whereupon the centrifugal governor D of motor A comes into full control of that motor, the same as if the pressure regulator were not provided.

As will be obvious, the two motors A and B, instead of driving a common power shaft, may transmit their power to some common point in other ways; for example, by driving electric generators connected to common busbars. This is illustrated in Fig. 3, in which the same reference characters are employed as heretofore. G and H indicate electric generators, driven by motors A and B respectively, and connected by suitable conductors I and K to busbars L and M. It will be obvious that, with the two generators so connected, if the power output of motor A is decreased, by the action of its exhaust operated regulator, the governor of motor B will act to increase the power of that motor so that the two generators G and H, nevertheless together supply to the busbars the required current; and similarly, as the electric load on the two generators G and H varies, the governor of motor B will operate to vary the output from generator H so that the output from generator G need not be varied.

It will be obvious that the system is not restricted to a single pair of motors A and B, one controlled by an exhaust operated regulator, and the other not so controlled, but that the system may comprise any desired number of motors, any proper proportion of which, less than the whole, may be arranged to supply exhaust to the exhaust operated apparatus, the remainder being employed to effect the desired regulation and, if necessary, variation of total power output of the system.

Since the illustrations in the figures above referred to, are intended to be in the main diagrammatic, I have not attempted to show the parts to actual scale, or to illustrate the various parts in their proper proportions as to size, etc.

What I claim is:—

1. A system of power generation and exhaust utilization, comprising a plurality of fluid pressure motors delivering work to a common point, exhaust-utilizing means receiving the exhaust of less than the total number of said motors, regulating means for the motor or motors exhausting into said exhaust-utilizing means and controlled by the pressure of such exhaust, and power regulating means for the motor or motors which do not exhaust into said exhaust-regulating means.

2. A system of power generation and exhaust utilization, comprising a plurality of fluid pressure motors delivering work to a common point, exhaust-utilizing means receiving the exhaust of less than the total number of said motors, regulating means for the motor or motors exhausting into said exhaust-utilizing means and controlled by the pressure of such exhaust, and speed regulating means for the motor or motors which do not exhaust into said exhaust-regulating means.

3. A system of power generation and exhaust utilization, comprising a plurality of steam motors delivering work to a common point, steam-heated means receiving the exhaust of less than the total number of said motors, regulating means for the motor or motors exhausting into said steam heated means and controlled by the pressure of such exhaust, and power-regulating means for the motor or motors which do not exhaust into said steam heated means.

4. A system of power generation and exhaust utilization, comprising a plurality of steam motors delivering work to a common point, steam-heated means receiving the exhaust of less than the total number of said motors, regulating means for the motor or motors exhausting into said steam heated means and controlled by the pressure of such exhaust, and speed-regulating means for the motor or motors which do not exhaust into said steam heated means.

5. A system of power generating and exhaust utilization, comprising a plurality of fluid pressure motors delivering work to a common point, exhaust utilizing means receiving the exhaust of less than the total number of said motors, regulating means and controlling means for the motor or motors exhausting into said exhaust utilizing means, said regulating means comprising loaded fluid-pressure-operated means arranged to be actuated by the pressure of such exhaust, and operatively connected to the corresponding controlling means, and power regulating means for the motor or motors which do not exhaust into said exhaust regulating means.

6. A system of power generation and exhaust utilization, comprising a plurality of fluid pressure motors delivering work to a common point, exhaust utilizing means receiving the exhaust of less than the total number of said motors, controlling valves for said motors, loaded fluid-pressure-operated means for the motor or motors exhausting into said exhaust-utilizing means, and arranged to be actuated by the pressure of such exhaust, and operatively connected to the controlling valve or valves of the corresponding motor or motors, and automatic governing means for the motor or motors which do not exhaust into said exhaust-regulating means.

7. A fluid-pressure-operated regulating device for fluid-pressure motors adapted to work under back pressure, and comprising a fluid-pressure-operated device adapted for connection to the exhaust of such a motor or motors, and to be operated in one direction by the pressure of such exhaust, loading means acting upon such fluid-pressure-operated device in opposition to the exhaust pressure thereon, motor controlling means and means, including a latch adapted to be engaged with or disengaged from said motor controlling means, for at will connecting said fluid-pressure-operated means to, or disconnecting same from, said motor controlling means.

8. A fluid-pressure-operated regulating device for fluid pressure motors adapted to work under back pressure, and comprising a fluid-pressure-operated device adapted for connection to the exhaust of such a motor or motors and to be operated in one direction by the pressure of such exhaust, loading means acting upon such fluid-pressure-operated device in opposition to the exhaust pressure thereon, motor controlling means, a centrifugal governor therefor, connecting means operatively connecting said centrifugal governor and motor controlling means, and means including a latch adapted to be engaged with or disengaged from said means connecting the centrifugal governor and motor controlling means, for detachably connecting said fluid-pressure-operated device and said means connecting the centrifugal governor and motor controlling means.

9. The combination with a fluid-pressure motor and exhaust-utilizing means connected thereto to receive the exhaust thereof, of regulating means for said motor comprising a fluid-pressure-operated device connected to the exhaust of such motor, a controlling valve for such motor, a centrifugal governor, a lever connecting said governor and controlling valve, and means connecting said fluid-pressure-operated device to said lever.

10. A regulating device such as described, comprising a fluid-pressure-operated device, loading means therefor, motor controlling means, a centrifugal governor, connecting means connecting said governor to said motor controlling means, and means detachably connecting said fluid pressure operated device to said connecting means, comprising a jointed member, a spring thereon and spring-actuated means mounted on said jointed member and adapted to be pressed by said spring against said connecting means.

11. Regulating means such as described, comprising in combination a fluid-pressure-operated device, loading means therefor, a motor controller, a centrifugal governor, a lever operatively connecting said governor to said motor controller, a member for operatively connecting said fluid-pressure-operated device to said lever, a spring on said member, the strength of which is less than that of said loading means, whereby said spring is caused to act on said connecting member when the exhaust pressure on said fluid-pressure-operated means is insufficient to overcome the load on said fluid-pressure-operated device.

12. Regulating means such as described, comprising a fluid-pressure-operated device, loading means therefor, a motor controller, a centrifugal governor, a lever operatively connecting said governor to said motor controller, and a jointed rod connected to said fluid-pressure-operated device and adapted to engage said lever to operatively connect the fluid-pressure-operated device to said lever, or at will, to be disengaged from said lever to disconnect said fluid-pressure-operated device and lever.

13. Regulating means such as described, comprising a fluid-pressure-operated device, loading means therefor, a motor controller, a centrifugal governor, a lever operatively connecting said governor to said motor controller, and provided with wedge shaped projections, and a rod hinge-connected to said fluid-pressure-operated device and adapted at will to be engaged with said wedge-shaped projections, or to be disengaged therefrom.

In testimony whereof I have signed this specification in the presence of two subscribing witnesses.

HALFDAN BIRGER KARLIN.

Witnesses:
WALDEMAR BOMAN,
T. EKSBOHM.